March 21, 1939.  S. SCHNELL  2,150,991
BRAKE ACTUATING MECHANISM
Filed June 22, 1936
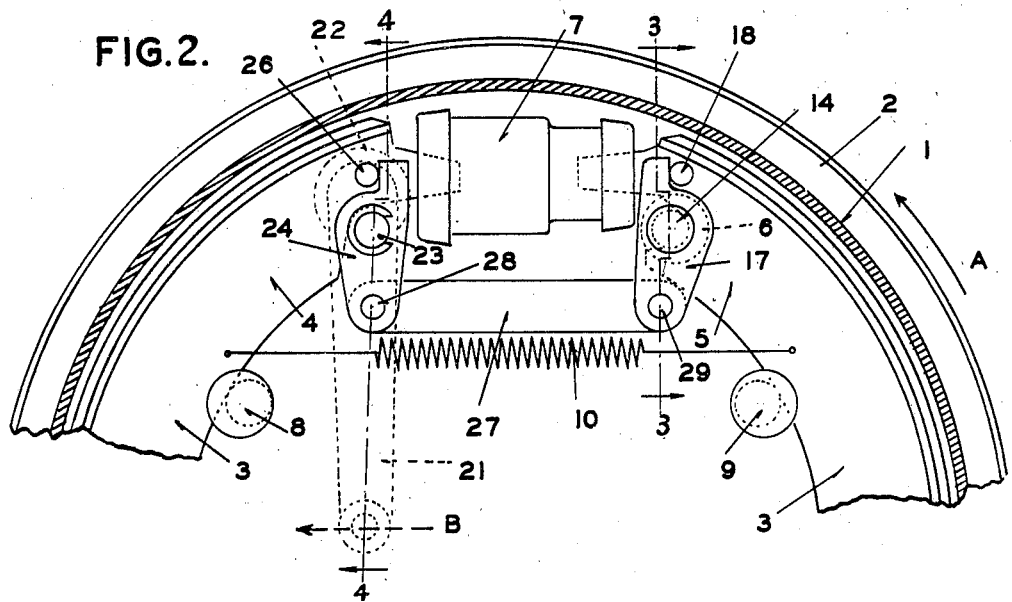
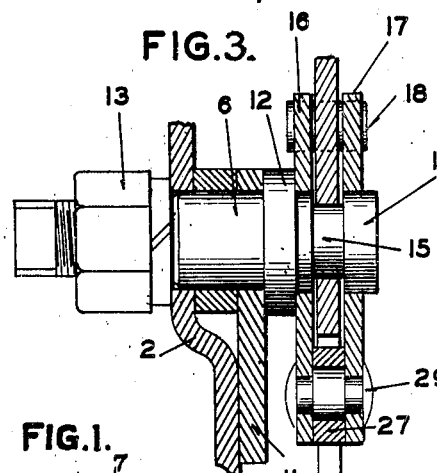
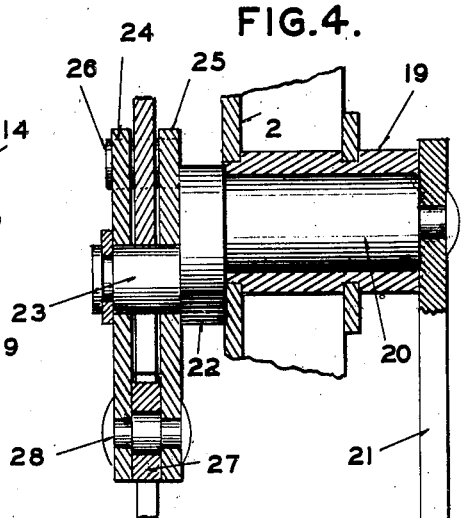
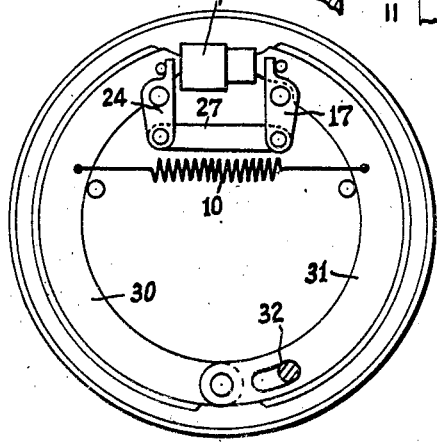
INVENTOR.
STEVE SCHNELL
BY
ATTORNEY.

Patented Mar. 21, 1939

2,150,991

UNITED STATES PATENT OFFICE 2,150,991

BRAKE ACTUATING MECHANISM

Steve Schnell, Overland, Mo., assignor to Wagner Electric Corporation, St. Louis, Mo., a corporation of Delaware Application June 22, 1936, Serial No. 86,498

3 Claims. (Cl. 188—152)

My invention relates to braking mechanism and more particularly to a mechanical device for actuating the adjacent ends of a friction device into engagement with the brake drum.

One of the objects of my invention is to provide a mechanical means including interconnected levers for actuating the adjacent ends of the friction device into engagement with the drum with equal pressures.

Another object of my invention is to provide a mechanical actuating device that can be incorporated in a fluid-actuated brake without substantial alterations of standard designs and arrangements and which will occupy a minimum amount of space.

Still another object of my invention is to provide a mechanical actuating device for a brake that is simple in construction, economical to manufacture, and efficient in operation.

Other objects of my invention will become apparent from the following description taken in connection with the accompanying drawing in which Figure 1 is a view of a brake embodying my invention; Figure 2 is an enlarged view of my novel mechanical expanding device; and Figures 3 and 4 are cross-sectional views taken on the lines 3—3 and 4—4, respectively, of Figure 2.

Referring to the drawing in detail, numeral 1 indicates a rotatable drum (shown in cross section) attached to the wheel of the vehicle and 2 indicates a support or backing plate which is secured to some fixed part of the wheel, generally the axle or axle housing. Mounted within the drum is a friction device 3 provided with adjacent spaced apart ends 4 and 5. This friction device may be of any desired construction, as for example, the band type or the two shoe type. In the specific embodiment shown the friction device comprises a pair of interconnected shoes. The upper end 5 of shoe 31 co-operates with a pin 6 which constitutes the anchor for the shoes when the drum is rotating in the direction indicated by arrow "A" and when the drum is rotating in the opposite direction, the shoes anchor on the pin 32 which cooperates with the lower end of shoe 31. The adjacent ends 4 and 5 of the friction device are adapted to be actuated into cooperative engagement with the drum in a well known manner by the fluid motor 7 and retracted from the drum and into engagement with the adjustable stops 8 and 9 by spring 10 when the fluid motor is inoperative.

In accordance with my invention I have provided on the type of brake mechanism illustrated a mechanical device for also expanding ends 4 and 5 of the friction device into engagement with the drum either independently of or simultaneously with the action of the fluid motor. My mechanical device is also so constructed that anchor pin 6 may be employed as part of the device although it is to be understood that when the brake is not provided with an anchor pin such as 6, a similar pin is employed which does not have any anchoring function for the brake. This pin is shown as having bearing in backing plate 2 and a re-enforcing plate 11 suitably secured to the backing plate by welds, and the pin is secured to the backing plate by being clamped thereto by means of a flange 12 and a nut 13. The inner end of the pin is provided with an extended integral portion 14 having a groove 15 in which is adapted to rest end 5 of the friction device in abutting relation with the base of the groove. The axis of portion 14 is slightly eccentric to the axis of pin 6 in order to permit slight adjustment of the anchor. A pair of companion levers 16 and 17 are pivoted to extension 14 of pin 6 and positioned on opposite sides of end 5 of the friction device and the upper end of these levers are adapted to engage pin 18 carried by end 5 of the latter mentioned end of the friction device.

Backing plate 2 on the opposite side of the fluid motor from pivot pin 6 has mounted therein and secured thereto a bearing 19 in which is journaled a shaft 20 adapted to be rotated by a lever arm 21 secured to the external arm of the shaft outside the backing plate. The inner end of this shaft has an enlarged portion 22 which carries an integral pin 23, the axis of which is eccentric to the axis of shaft 20. Pivotally mounted upon this eccentric pin 23 is a pair of companion levers 24 and 25 positioned on opposite sides of end 4 of the friction device, and the upper ends of these levers are adapted to engage a pin 26 carried by the latter mentioned end of the friction device.

The lower ends of the companion levers 24 and 25 are pivotally connected to one end of link 27 by means of pivot pin 28 and the lower end of the companion levers 16 and 17 are pivotally connected to the other end of link 27 by means of pin 29, thereby forming a connecting means between the levers whereby one set of levers may transmit movement to the other set of levers.

Referring to the operation of my mechanical expanding device just described, when lever 21 is moved in the direction indicated by arrow "B" by any suitable mechanism connected thereto, shaft 20 will be rotated in a clockwise direction (Figure 1) carrying with it eccentric pin 23. This movement of the eccentric pin will move the companion levers 24 and 25 and, as a result of their engagement with pin 18, end 4 of the friction device will be moved into engagement with the drum. The movement of these companion levers will also cause the companion levers 16 and 17 to be rotated upon extension 14 of pivot pin 6 due to connecting link 27 between the two sets of companion levers. As a result of the rotation of levers 16 and 17, end 5 of the friction device will be forced into engagement with the drum since the upper ends of these levers are in engagement with pin 18 carried by the end of the friction device. Continued rotation of shaft 20 by the movement of arm 21 will simultaneously force both ends of the friction device into tighter engagement with the drum and produce the desired braking effect. Since both sets of companion levers are pivotally mounted intermediate their ends, both ends of the friction device will be expanded with equal force as any excess pressure applied to one shoe will react on the other shoe as a result of connecting link 27 between the sets of levers.

Due to the fact that the levers are not connected directly to the ends of the friction device but only engage pins 18 and 26, the mechanical expanding device will not be actuated in any way when the ends of the friction device are moved by fluid motor 7. Likewise, the fluid motor will not be operated in any manner when the ends of the friction device are expanded by the mechanical actuating device. Also it is apparent that both the mechanical and fluid devices may be operated simultaneously if desired to move the ends of the friction device into engagement with the drum.

From the foregoing description the advantages of the brake construction just described are readily apparent. It can be seen that it is capable of applying equal pressure to the ends of the friction device. It is also apparent that the device is very compact yet at the same time rugged in construction. The device is also so designed that it may be easily incorporated in a fluid-operated brake without substantial alterations of standard designs and arrangements of the parts. It is also to be noted that the construction is such that an anchor pin for one of the ends of the friction device may also serve as a part of the expanding device. The entire mechanism is also very easily actuated due to eccentric pin 23 on the shaft and lever 21 which has a lever arm many times the length of the lever arm of the eccentric pin.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In mechanism of the class described, a rotatable drum, a support, a friction device mounted on the support for cooperation with the drum and provided with adjacent ends, an anchor pin for one of said ends and carried by the support, a lever pivoted on said anchor pin and engaging the end of the friction device, a second lever spaced from the first lever and engaging the other end of the friction device, a connection between the two levers, a rotatable shaft, and an eccentric member carried by said shaft for pivotally supporting and moving the second named lever.

2. In mechanism of the class described, a rotatable drum, a support, a friction device mounted on the support for cooperation with the drum and provided with adjacent ends, a pin carried by each adjacent end of the friction device and projecting from both sides thereof, a pair of like levers pivoted intermediate their ends to the support and having their upper ends abutting the ends of the pin carried by one end of the friction device, a second pair of like levers pivoted intermediate their ends to the support in spaced relation to the other levers and having their upper ends abutting the ends of the pin on the other end of the friction device, a link connecting the lower ends of all the levers, and means for moving the pivot of one pair of levers relative to the support and comprising a shaft carried by the support and having an eccentric portion forming the pivot for said pair of levers.

3. In mechanism of the class described, a rotatable drum, a support, a friction device mounted on the support for cooperation with the drum and provided with adjacent ends, a lever pivoted intermediate its ends to the support and having one of its ends in abutting relation with one end of the friction device to thereby permit said end of the friction device to be moved relatively to said lever, a shaft journaled on the support and provided with an eccentric portion, a second lever pivotally mounted intermediate its ends on the eccentric portion and having one of its ends in abutting relation with the other end of the friction device to thereby permit said end of the friction device to be moved relatively to said lever, said shaft forming the sole support for said second lever, a link connecting the other ends of the levers, and means for rotating said shaft.

STEVE SCHNELL.